United States Patent [19]
Smith, Jr.

[11] 3,954,539
[45] May 4, 1976

[54] CRYOGENIC CONSTRUCTION AND ARTICLE THEREFOR

[75] Inventor: Hubert Stacy Smith, Jr., Bay City, Mich.

[73] Assignee: The Dow Chemical Company, Midland, Mich.

[22] Filed: Sept. 16, 1974

[21] Appl. No.: 506,365

Related U.S. Application Data

[62] Division of Ser. No. 302,839, Nov. 1, 1972.

[52] U.S. Cl. ............................. 156/185; 156/192; 156/195; 156/301
[51] Int. Cl.² ........................................ B65H 81/00
[58] Field of Search .................. 156/195, 191–192, 156/300–303, 77–78, 187, 188; 161/159–161; 264/46.7; 52/80; 138/140, 148, 149, 150, 154, DIG. 9

[56] References Cited
UNITED STATES PATENTS

| | | | |
|---|---|---|---|
| 1,903,106 | 3/1933 | Gillies | 138/150 |
| 3,485,000 | 12/1969 | Fiquet | 52/80 |
| 3,726,951 | 4/1973 | Smith et al. | 264/46.7 X |
| 3,734,811 | 5/1973 | Small | 161/159 X |
| 3,769,118 | 10/1973 | Tariel et al. | 161/159 X |
| 3,816,234 | 6/1974 | Winfield | 161/161 X |
| 3,830,899 | 8/1974 | Piccioli | 161/160 X |
| 3,860,478 | 1/1975 | Bartlow | 161/161 X |

FOREIGN PATENTS OR APPLICATIONS

| | | |
|---|---|---|
| 955,960 | 4/1964 | United Kingdom |

*Primary Examiner*—William A. Powell
*Assistant Examiner*—David A. Simmons
*Attorney, Agent, or Firm*—Robert B. Ingraham

[57] ABSTRACT

An improved method and article are provided for cryogenic construction and the article is particularly useful when employed with the spiral generation method of applying insulation. An insulating member is provided having a face member having an elongate cross-section and a plurality of backing members also of elongate cross-section adhered to a face of the backing member. Fracturing of the insulation on temperature cycling is substantially reduced.

1 Claim, 2 Drawing Figures

CRYOGENIC CONSTRUCTION AND ARTICLE THEREFOR

CROSS-REFERENCE TO RELATED APPLICATION

This is a division of application Ser. No. 302,839 filed Nov. 1, 1972.

Insulation of large cryogenic vessels is often accomplished with considerable difficulty. One particularly desirable method of applying such insulation or providing a walled structure of low thermal conductivity is by means of a spiral generating technique wherein an elongate insulating member is wound in a generally helical or helical spiral fashion to provide a plurality of loops or turns and adjacent loops or turns being bonded to each other to provide a unitary structure. Techniques for making such structures from a preformed foamed element are well known and are disclosed in U.S. Pat. Nos. 3,206,899; 3,337,384; 3,358,325; 3,372,430; 3,372,431; 3,376,602; 3,442,992 and 3,507,735. Oftentimes insulation thickness of several inches is required to provide an insulating body of the desired low thermal conductivity. One particularly convenient mode of fabricating such a structure is from an elongate strip, log or plank of foamed plastic insulation material having as one dimension the desired thickness of the insulation. However, in many instances when the container is cooled to operating temperature random cracking occurs in the insulation initiating adjacent the surface of the cooled container. Such random cracking can reduce the efficiency of the insulation and in some instances can lead to undesirable weakening of the insulating layer.

It would be desirable if there were available an improved elongate insulating member for the insulation of cryogenic vessels which would show reduced cracking tendency.

It would also be desirable if such an insulating member would show reduced tendency for cracks to propagate therethrough.

It would further be desirable if such an improved insulating member were readily fabricated from available materials.

These benefits and other advantages in accordance with the present invention are achieved in an elongate insulating member having a generally rectangular cross-sectional configuration, the elongate member comprising a first or facing body of an insulating material, the facing body having an external surface and an internal surface extending across at least one surface of the cross-sectional configuration and the length of the body, the external surface and the internal surface being generally oppositely disposed to each other, a plurality of internal members affixed to the internal surface and extending generally the entire width thereof, each of the internal members having a length generally commensurate with the length of the body, the internal members being affixed to the internal face of the facing member and in adjacent relationship to at least one other internal member.

Also contemplated within the scope of the present invention is a method of fabricating a spirally generated structure wherein the hereinbefore described members are deposited in a generally helically spiral fashion wherein adjacent loops are affixed to each other wherein the external face of the facing member is disposed remotely from the cryogenic vessel and the backing members are disposed adjacent the cryogenic vessel.

Further features and advantages of the present invention will become more apparent from the following specification taken in connection with the drawing wherein.

Figure 1:
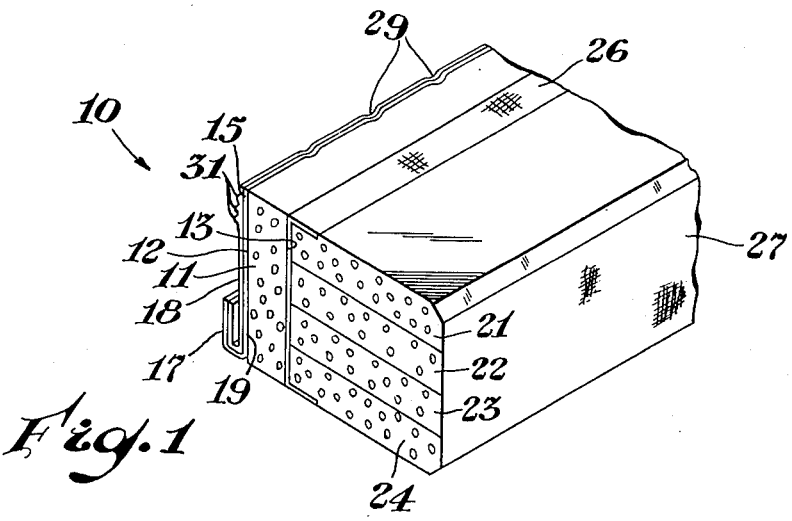
FIG. 1 is a schematic isometric representation of an end view of an insulating member in accordance with the present invention.

In FIG. 1 there is shown a schematic isometric representation of one end of an elongate insulating member generally designated by the reference numeral 10. The insulating member 10 comprises a first or face member 11. The facing member 11 has an external face 12 and an internal face 13. The member 11 has a width generally commensurate with the height of the insulating member 10 and extends entirely across the height of the member 10 as shown in FIG. 1. A laminate 15 is affixed to the surface 12 of the member 11. The laminate has a generally J-shaped configuration wherein one edge thereof is folded outwardly about 180° to form a flange 17. The laminate 15 comprises a first or outer layer 18 which beneficially is metal such as aluminum. The laminate has a second layer 19 which advantageously is a heat sealable adhesive; for example, a copolymer of about 80 percent ethylene and 20 percent acrylic acid. Other well known adhesives such as epoxy resins and the like are also employed with benefit. Affixed to the internal face 13 of the facing element 11 are a plurality of internal insulating members 21, 22, 23 and 24 in adjacent generally contiguous relationship. The members 21, 22, 23 and 24 together cover the internal face 13 of the facing member 11. A reinforcing scrim 26 is disposed at the interface between the facing member 11 and the internal elements 21, 22, 23 and 24 and is folded over the adjacent internal elements 21 and 24. Beneficially, the scrim 26 for most applications is an open weave glass fabric. Disposed on the elements 21, 22, 23 and 24 remote from the scrim 26 beneficially is a second scrim 27. Adjacent faces of the elements 21 and 22 are not joined, but are free to separate when the temperature of the inner members remote from the laminate 15 are reduced. The second scrim or fiber reinforcement 27 is affixed to the inner members 21, 22, 23 and 24 at a location generally parallel to and remote from the scrim 26. The reinforcement 27 markedly reduces the tendency for crack initiation as the temperature of the face carrying the scrim 27 is reduced. Advantageously the scrim 27 is slit at locations corresponding to the interfaces between the internal members. A plurality of transverse corrugations 29 are formed in the laminate 15. The corrugations 29 extend toward the J-shaped edge. A plurality of generally continuous beads 31 of a heat activable adhesive are disposed on the outer surface of the laminate 15 remote from the J-shaped fold.

Figure 2:
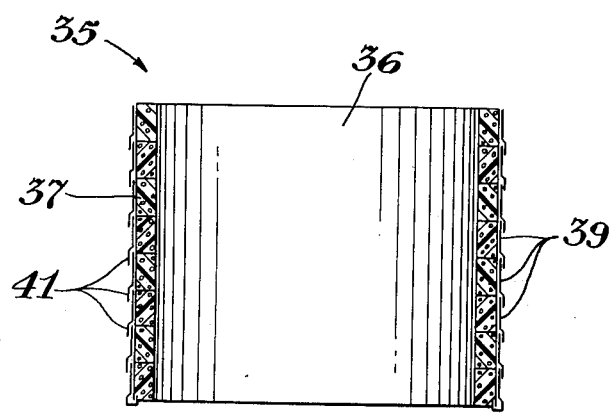
FIG. 2 is a schematic sectional representation of a cryogenic vessel partially insulated using the method and article of the invention.

FIG. 2 schematically depicts a structure prepared employing elements of FIG. 1. The structure is generally designated by the reference numeral 35. The structure 35 comprises a vessel 36 such as a cryogenic vessel surrounded by a generally cylindrical insulating body 37. The cylindrical insulating body 37 is made up of a plurality of turns of insulation material 39 having a structure generally similar to that depicted in FIG. 1. Each of the turns has a flange 41 equivalent to the flange 17 which has been bent downwardly, flattened against the outer layer of the adjacent lower turn and sealed to provide a generally liquid-proof exterior surface.

Generally in preparing articles in accordance with the present invention, the corrugations such as the core corugations 29 extend partly across the laminate and provide for controlled buckling of the metallic laminate when the strip is wound onto a surface such as the spherical surface. The controlled buckling introduced by the corrugations provides a relatively shallow depression which occurs at regular intervals. Beneficially, the quantity of a heat activable adhesive 31 such as a strip of bitumen, ethylene acrylic acid copolymer or ethylene vinyl acetate copolymer is sufficiently large that on heat sealing of the skin member to the adjacent strip, such as is depicted in FIG. 2, the minor depressions corresponding to the corrugations are filled and a liquid tight outer surface is obtained.

Particularly advantageous insulating members in accordance with the present invention are employed using synthetic resinous closed cell thermoplastic foams such as polystyrene foam, thermoplastic polyurethane foam, polyvinyl chloride foam, polyolefin foam such as polyethylene foam and polypropylene foam and the like having a closed cell structure. In the preparation of the insulating articles of the present invention, if desired diverse foams may be employed.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed on interpreted as being restrictive or otherwise limiting of the present invention, excepting as it is set forth and defined in the hereto-appended claims.

What is claimed is:

1. A method for fabricating a spirally generated structure wherein a plurality of turns are deposited in a generally helical spiral fashion and adjacent loops affixed to each other to provide an integral structure about a cryogenic vessel, the improvement which comprises employing as the insulating member an elongate insulating member having a generally rectangular cross-sectional configuration, the elongate member comprising a first or facing body of an insulating material comprising synthetic resinous closed cell thermoplastic foam, the facing body having an external surface and an internal surface extending across at least one surface of the cross-sectional configuration and the length of the body, the external surface and the internal surface being generally oppositely disposed to each other, a plurality of internal members, the internal members being affixed to the internal surface and extending generally the entire width thereof, each of the internal members having a length generally commensurate with the length of the body, the internal members being affixed to the internal face of the facing member and in adjacent relationship to at least one other internal member, adjacent faces of the internal elements are not joined but are free to separate when the temperature of the inner members remote from the external surface are reduced and a reinforcing scrim adhered to the internal members at a location remote from the internal face of the facing body.

* * * * *